March 28, 1939. F. ILLY 2,152,410
APPARATUS FOR THE PREPARATION OF COFFEE INFUSIONS
Filed Aug. 28, 1936 2 Sheets-Sheet 1
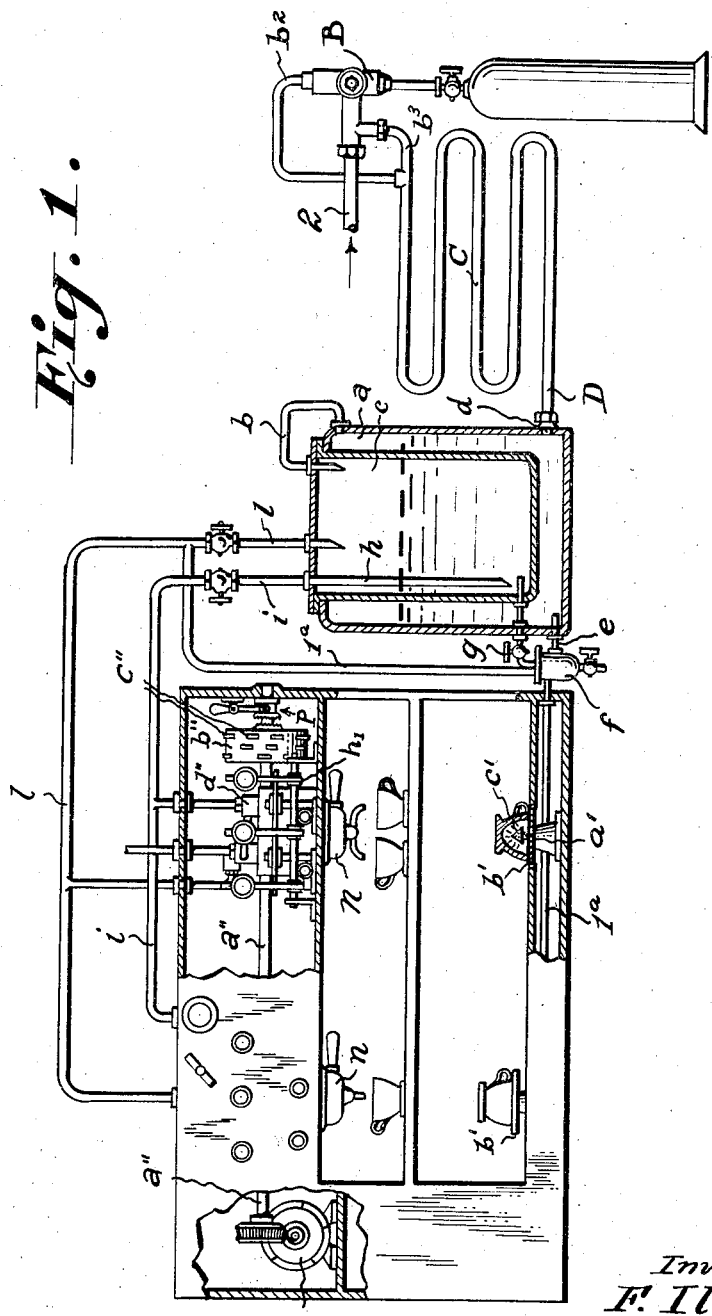

March 28, 1939. F. ILLY 2,152,410
APPARATUS FOR THE PREPARATION OF COFFEE INFUSIONS
Filed Aug. 28, 1936 2 Sheets-Sheet 2

Inventor,
F. Illy
By: Glascock Downing & Seibold
Attys.

Patented Mar. 28, 1939

2,152,410

UNITED STATES PATENT OFFICE 2,152,410

APPARATUS FOR THE PREPARATION OF COFFEE INFUSIONS

Francesco Illy, Triest, Italy

Application August 28, 1936, Serial No. 98,410
In Italy September 9, 1935

3 Claims. (Cl. 53—3)

The invention has for object an apparatus for the quick and automatic preparation of coffee infusion, and the like.

The preparation of coffee infusion is still carried out in an empiric manner. All machines, cans and implements heretofore used are not such as to provide a perfect infusion in the proper acceptance of the word.

The essential conditions for obtaining a perfect infusion require that the water should have solving properties and the temperature of the water at the moment when applied to the coffee should not be above 100° centigrade. A correct measuring of the water with respect to the amount of coffee is also necessary.

Accordingly it is an object of the present invention to provide apparatus for rendering water such as to provide complete dissolution of the organic substances of the coffee and to supply a predetermined quantity of the rectified water at the proper temperature to the coffee grounds.

Other and further features and objects of the invention will be more apparent to those skilled in the art upon a consideration of the accompanying drawings and the following description wherein an exemplary embodiment of the invention is disclosed.

In the drawings:

Fig. 1 is an elevational view partly in section illustrating the general organization of the apparatus.

Figure 3:
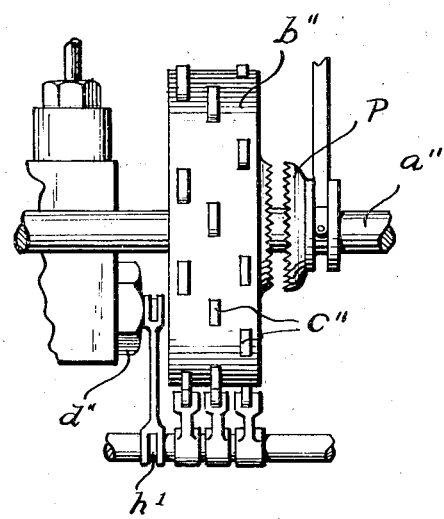
Fig. 3 is a plan view of the drum showing a cam-actuated lever for automatically opening the water valve.
Figure 2:
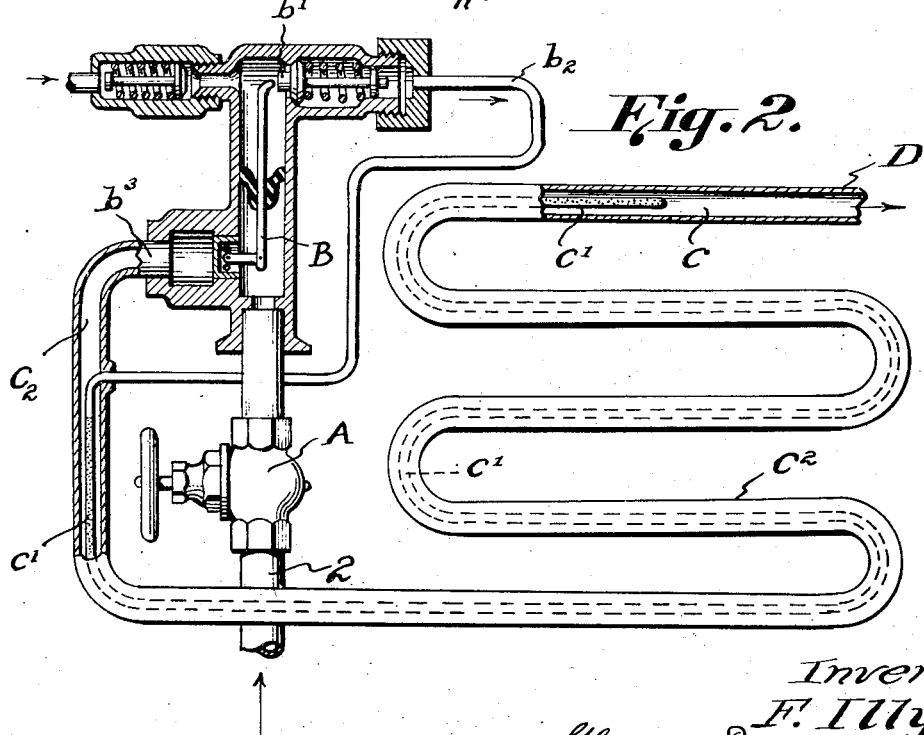
Fig. 2 is an enlarged sectional view of the water rectifying apparatus.

The water rectifying device (Fig. 1) comprises a valve A in the pipe 2 through which the water enters. The water then passes through the automatic valve B where, by its pressure, it opens the valve $b_1$ provided in the carbon anhydride piping, so that this gas can issue through the nozzle $b_2$. The water flows, through the connecting piping $b_3$ into the coil C. The coil C consists of an inner pipe $c_1$, pierced with small holes, for the passage and exit of the carbon anhydride, and of an outer pipe $c_2$ for passage of the water. Into the water flowing through the pipe $c_2$ is therefore injected the $CO_2$ gas issuing through the small holes of the inner pipe $c_1$, so that the water, richly saturated with the said gas, passes into the double steam boiler through the connecting piping D.

The double steam boiler serves a double purpose namely that of realizing the second phase of the water rectification, and that of feeding the automatic sets with steam and water as well as of feeding the steam sterilizer.

The double boiler is built of an external boiler $a$, the upper portion of which is connected by a piping $b$ to the inner boiler $c$ arranged inside the boiler $a$. The connection established by the piping $b$ between the two boilers provides that the pressure will be exactly the same in both boilers.

Near the bottom of the external boiler $a$ the piping D is connected which leads water from the saturation coil of the rectifier and provides the feed inlet $d$ of the boilers. To the boiler bottom a pipe $e$ is fitted providing a connection between the two boilers in which a filter $f$ is arranged, in order that the water may flow from the external boiler $a$ to the internal boiler $c$ after passing through the filter $f$.

The filter $f$ is provided with a non-return valve $g$ fitted on the connecting pipe.

In the internal boiler $c$ a pipe $h$ is arranged through which the water from the boiler $c$ passes into the piping $i$ leading to the automatic sets for the preparation of the infusion and feeding them. On the cover of the inner boiler $c$ a connecting piping $l$ is provided for feeding the automatic sets with steam.

The double boiler is preferably made of enamelled iron in order to prevent corrosion, and it may be provided with all the necessary control and safety fixtures requisite for steam boilers.

The second phase of the water rectification takes place in the following manner: The water saturated with $CO_2$ gas is supplied by the connecting piping D and enters the external boiler $a$ through the inlet opening $d$. The valve $g$ remains closed until a pressure of at least 1 atm. is attained in the external boiler.

In the boiler $a$, which thus remains isolated from the still empty internal boiler $c$, the water undergoes its transformation. A portion of the $CO_2$ dissolved therein brings about, under the pressure, a chemical combination with the calcium and magnesium, if any of them are present in the water, thus quickly forming crystal precipitations of calcium carbonate and magnesium carbonate. A portion of the $CO_2$ remains half-bound with the water, to which it bestows a pronounced solving property and a very agreeable acid taste.

When a pressure of 1 atm. is reached in the boiler $a$, the valve $g$ opens and remains open, even when fresh water is fed into the boiler $a$, provided the pressure in the latter does not fall below 0.8 atm.

On the valve $g$ being opened, the water will enter the filter $f$ and there be freed from all sediments and precipitates, so that it enters the boiler $c$ with the ideal properties for an excellent coffee in fusion, that is to say it enters the boiler $c$ in the completely rectified conditions requisite for being fed to the automatic sets.

The filter $f$ should be so designed as to permit removal of the precipitates collected therein, through a drain cock, and the filter should be susceptible of easy cleaning.

The cup sterilizing and warming device comprises one or more steam valves $a'$ provided with a plate $b'$. The valve $a'$ is connected to the double boiler by a pipe $l^a$. The valves $a'$ serve a double purpose, namely that of realizing a quick and rapid sterilization of the cups, especially of their edge and inner surface because the steam jet at 100° C. temperature impinges against all parts of the cup which may be contaminated with germs and the second purpose being that of directly warming the cup.

The operation of the sterilizing device is as follows: The reversed cup is pressed on the plate $b'$ and thereby the valve $a'$ is opened so that steam issues from the center nozzle $c'$.

The automatic set for the preparation of the infusion includes a shaft $a''$ which is adapted to be driven by the motor 4. A drum $b''$ is rotatably mounted on the shaft $a''$ and the drum may be caused to rotate by actuation of the clutch $p$ so as to lock the drum to the shaft. A plurality of cams $c''$ are arranged on the periphery of the drum at circumferentially spaced intervals and these cams are provided for the purpose of actuating various valves including a spring biased valve $d''$ arranged in the water supply pipe $i$ leading from the boiler $c$.

The coffee grounds are adapted to be held in the container $n$ by means of any well known strainer (not shown) and the container is supported in position immediately below the valve $d''$. The valve is properly connected to feed water from the pipe $i$ onto the coffee grounds in the container $n$ when the same is opened. Predetermined quantities of water are thus supplied to the coffee grounds by rotation of the drum $b''$ which causes the valve operating lever $h^1$ to be actuated by engagement of the cam $c''$.

The time during which the valve $d''$ remains open is a function of the speed of the drum $b''$ which may be constant and the circumferential dimensions of the cams $c''$. Thus the quantity of water supplied from the boiler $c$ to the coffee grounds may be predetermined by fixing the speed of the shaft $a''$ and the dimensions of the cams $c''$ so that the movement of the rectified water to the coffee grounds thus becomes automatic.

Although the invention has been described with reference to the specific apparatus disclosed it is apparent that modifications may be made therein. Such modifications may be made without departing from the spirit and scope of the invention as set forth in the appended claims.

I claim:

1. Apparatus for automatic preparation of coffee infusions comprising in combination, a water supply, means introducing carbon dioxide into the water, a boiler having two closed compartments into one of which the water carrying the carbon dioxide is fed, means for heating the boiler, a valve operably responsive to the pressure within one of said compartments to pass the fluid therefrom to the other compartment and means associated with said valve adapted to remove solid matter from the fluid passing from the first compartment to the second, and means for carrying the heated fluid to a container for the coffee grounds.

2. Apparatus for automatic preparation of coffee infusions comprising in combination, a water supply, means introducing carbon dioxide into the water, a boiler having two closed compartments into one of which the water carrying the carbon dioxide is fed, means for heating the boiler, a valve operably responsive to the pressure within one of said compartments to pass the fluid therefrom to the other compartment and means associated with said valve adapted to remove solid matter from the fluid passing from the first compartment to the second, and means for supplying a predetermined quantity of the fluid contained in said second compartment to a container for the coffee grounds.

3. Apparatus for automatic preparation of coffee infusions comprising in combination, a water supply, means introducing carbon dioxide into the water, a boiler having two closed compartments into one of which the water carrying the carbon dioxide is fed, means for heating the boiler, a valve operably responsive to the pressure within one of said compartments to pass the fluid therefrom to the other compartment and means associated with said valve adapted to remove solid matter from the fluid passing from the first compartment to the second, a pipe communicating the second compartment with a container for the coffee grounds, and automatic means for controlling the movement of the fluid from the second compartment to the coffee container.

FRANCESCO ILLY.